US012659755B2

(12) United States Patent
Kotagiri et al.

(10) Patent No.: US 12,659,755 B2
(45) Date of Patent: Jun. 16, 2026

(54) RADIO QUALITY ESTIMATION METHOD, DEVICE AND SYSTEM

(71) Applicant: NEC Corporation, Tokyo (JP)

(72) Inventors: Dheeraj Kotagiri, Tokyo (JP); Anan Sawabe, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 429 days.

(21) Appl. No.: 18/027,015

(22) PCT Filed: Oct. 12, 2020

(86) PCT No.: PCT/JP2020/038415
§ 371 (c)(1),
(2) Date: Mar. 17, 2023

(87) PCT Pub. No.: WO2022/079747
PCT Pub. Date: Apr. 21, 2022

(65) Prior Publication Data
US 2023/0370858 A1     Nov. 16, 2023

(51) Int. Cl.
*H04W 16/18* (2009.01)

(52) U.S. Cl.
CPC ................................. *H04W 16/18* (2013.01)

(58) Field of Classification Search
CPC .................................................... H04W 16/18
See application file for complete search history.

(56) References Cited

U.S. PATENT DOCUMENTS

| | | | |
|---|---|---|---|
| 9,560,531 B1 * | 1/2017 | Chang ................... | H04L 41/145 |
| 2009/0138254 A1 * | 5/2009 | El-Damhougy ...... | G06F 13/387 |
| | | | 703/21 |
| 2017/0026862 A1 * | 1/2017 | Li .......................... | H04W 24/08 |

(Continued)

FOREIGN PATENT DOCUMENTS

| | | | | |
|---|---|---|---|---|
| CA | 2721486 A1 * | 10/2009 | ............. | H05B 45/20 |
| JP | 2003204296 A * | 7/2003 | | |

(Continued)

OTHER PUBLICATIONS

International Search Report for PCT Application No. PCT/JP2020/038415, mailed on Dec. 1, 2020.

(Continued)

*Primary Examiner* — Yuwen Pan
*Assistant Examiner* — Swati Jain
(74) *Attorney, Agent, or Firm* — Sughrue Mion, PLLC

(57) ABSTRACT
An object of the present disclosure is to provide a method capable of estimating the radio quality more accurately. The method includes acquiring first weather information and first geographic information at a first observation point, second weather information and second geographic information at a second observation point, and radio quality information at a radio base station; learning a model for estimating radio quality based on the first weather information and the first geographic information, the second weather information and the second geographic information, and the radio quality information; and estimating the radio quality using the model and at least one of third weather information at the first observation point or fourth weather information at the second observation point.

15 Claims, 6 Drawing Sheets

(56)                References Cited

U.S. PATENT DOCUMENTS

| 2019/0116587 | A1 * | 4/2019 | Zhang | H04W 8/005 |
| 2021/0076236 | A1 * | 3/2021 | Kimura | H04W 16/18 |
| 2021/0184940 | A1 * | 6/2021 | Andersson | H04L 41/147 |

FOREIGN PATENT DOCUMENTS

| JP | 2015082756 | A | * | 4/2015 | |
| JP | 2022055895 | A | * | 4/2022 | |
| WO | 2015/162878 | A1 | | 10/2015 | |
| WO | WO-2018216768 | A1 | * | 11/2018 | H04W 4/30 |
| WO | 2019/124067 | A1 | | 6/2019 | |

OTHER PUBLICATIONS

English translation of Written opinion for PCT Application No. PCT/JP2020/038415, mailed on Dec. 1, 2020.

* cited by examiner

[Fig. 1]
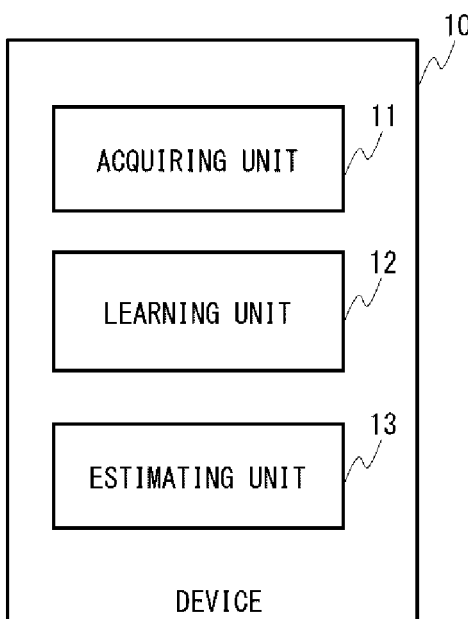

[Fig. 2]
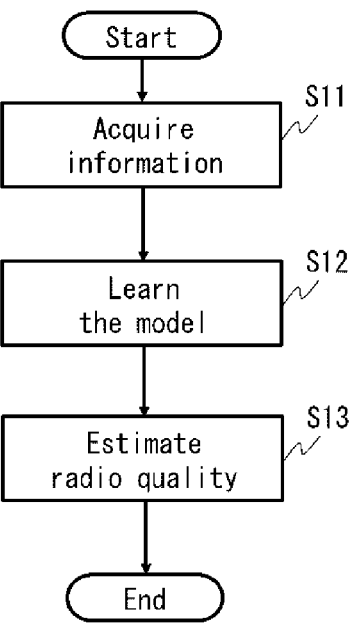
[Fig. 3]
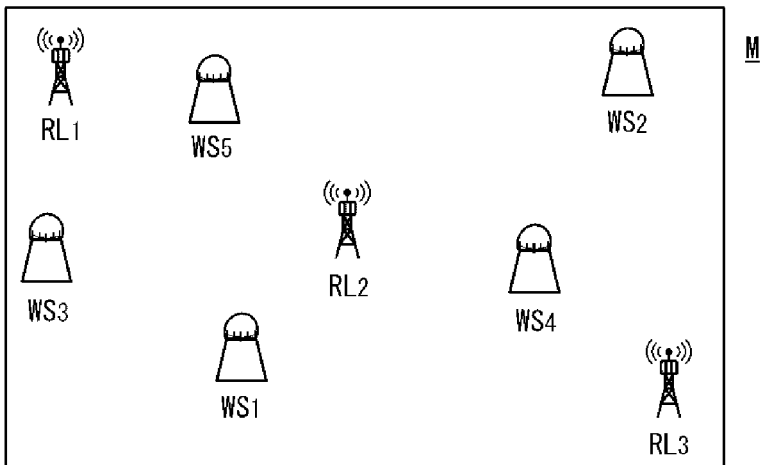

[Fig. 4]
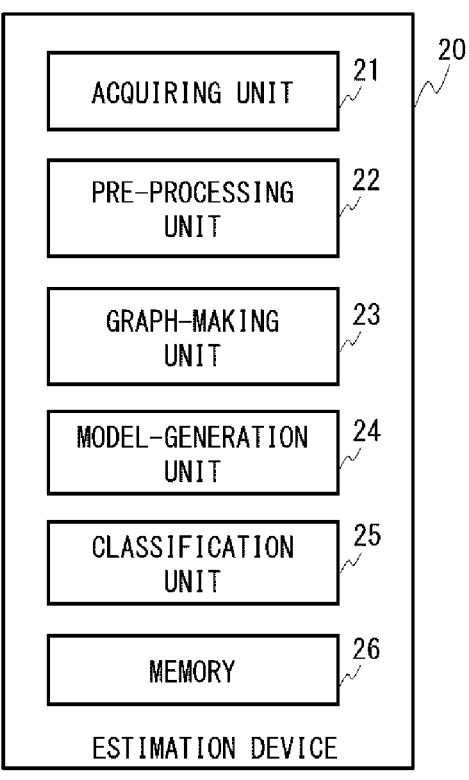
[Fig. 5]
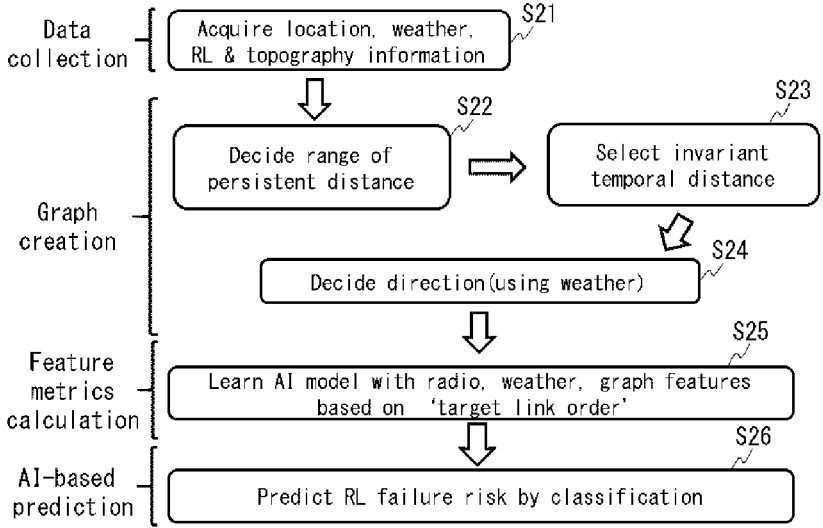

[Fig. 6]
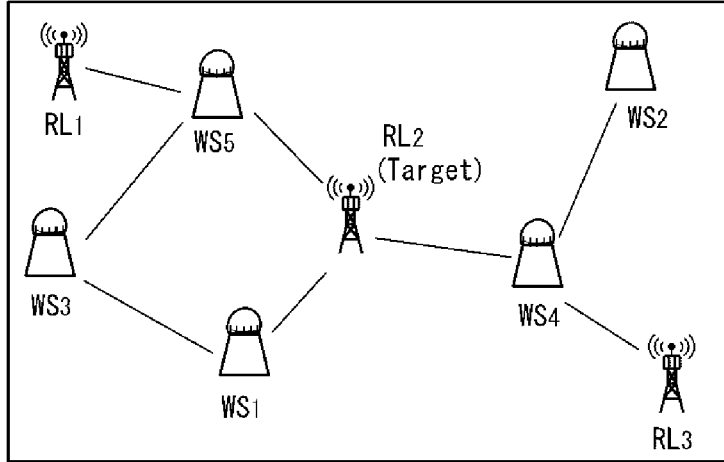
[Fig. 7]
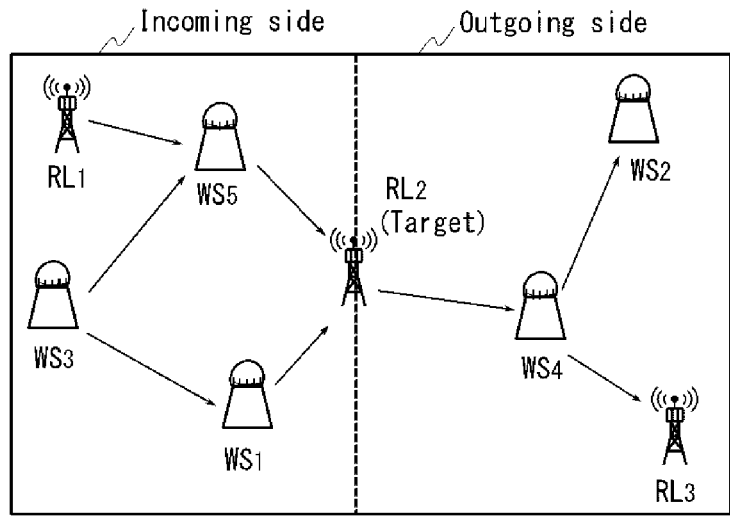

[Fig. 8]
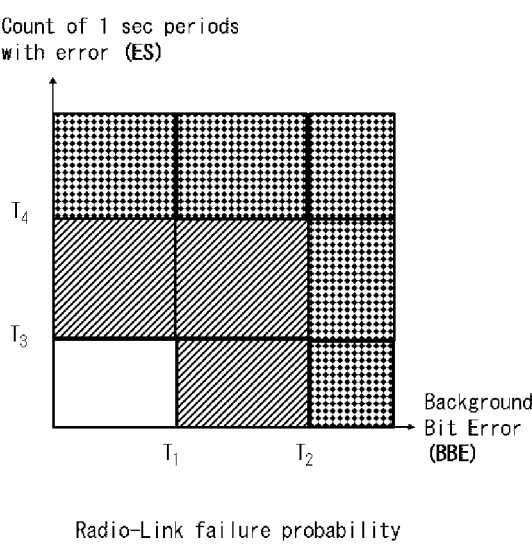
Count of 1 sec periods
with error (ES)
Background
Bit Error
(BBE)
Radio-Link failure probability
☐ Low     ▨ Medium     ▦ High

[Fig. 9]
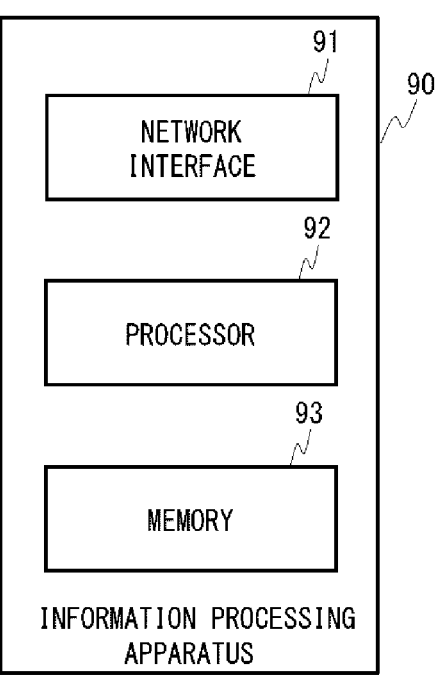

RADIO QUALITY ESTIMATION METHOD, DEVICE AND SYSTEM

This application is a National Stage Entry of PCT/JP2020/038415 filed on Oct. 12, 2020, the contents of all of which are incorporated herein by reference, in their entirety.

TECHNICAL FIELD

The present disclosure relates to a radio quality estimation method, device and system.

BACKGROUND ART

With the advent of 5G, mmWave bands are being increasingly used for wireless communication. Specially, they are often used for back-haul links. These back-haul links require high reliability—typically they should transmit data with over 99.999% correctness rates. Hence, even a small failure is critical for their operation.

However, radio links operating in mmWave bands are sensitive to weather conditions such as rain, snow, humidity and wind etc.

Regarding this problem, NPL 1 discloses a wireless communication control method to control wireless channel quality against a meteorological change. Precisely, a wireless communication control device (100) has an attenuation prediction unit (103) for predicting future attenuation from the history of attenuation in radio field intensity from another wireless communication machine (11) to a wireless communication machine (10), and a control unit (104) for controlling the wireless communication machine (10) on the basis of the predicted attenuation. As a future attenuation amount is estimated from time series attenuation amounts up to the present, wireless communication parameters of a wireless communicator can be controlled in advance before attenuation of a radio field intensity by a large weather change occurs.

CITATION LIST

Patent Literature

PTL 1: WO2015/162878

SUMMARY OF INVENTION

Technical Problem

As an example for solving the above problem, a method for predicting the radio wave condition using weather information measured by an observation station is conceivable. However, weather information may not be used directly to estimate the radio quality because of geographical reasons—for example, the distance from an observation station to a radio base station, and topography from the observation station to the radio base station. The method disclosed in NPL 1 does not focus this matter.

An object of the present disclosure is to provide a radio quality estimation method, device and system capable of estimating the radio quality more accurately.

Solution to Problem

In a first example aspect, a method includes:
acquiring first weather information and first geographic information at a first observation point, second weather information and second geographic information at a second observation point, and radio quality information at a radio base station;
learning a model for estimating radio quality based on the first weather information and the first geographic information, the second weather information and the second geographic information, and the radio quality information; and
estimating the radio quality using the model and at least one of third weather information at the first observation point and fourth weather information at the second observation point.

In a second example aspect, a device includes:
at least one memory configured to store instructions; and
at least one processor configured to execute the instructions to:
acquire first weather information and first geographic information at a first observation point, second weather information and second geographic information at a second observation point, and radio quality information at a radio base station;
learn a model for estimating radio quality based on the first weather information and the first geographic information, the second weather information and the second geographic information, and the radio quality information acquired; and
estimate the radio quality using the model and at least one of third weather information at the first observation point or fourth weather information at the second observation point.

In a third example aspect, a system includes:
a radio base station; and
a device, wherein
the device comprising:
at least one memory configured to store instructions; and
at least one processor configured to execute the instructions to:
acquire first weather information and first geographic information at a first observation point, second weather information and second geographic information at a second observation point, and radio quality information at the radio base station;
learn a model for estimating radio quality based on the first weather information and the first geographic information, the second weather information and the second geographic information, and the radio quality information; and
estimate the radio quality using the model and at least one of third weather information at the first observation point or fourth weather information at the second observation point.

Advantageous Effects of Invention

According to the present disclosure, it is possible to provide a radio quality estimation method, device and system capable of estimating the radio quality more accurately.

BRIEF DESCRIPTION OF DRAWINGS

FIG. 1 is a block diagram of a device according to a first example embodiment.

FIG. 2 is a flowchart illustrating a method for estimating radio quality according to a first example embodiment.

FIG. 3 is a map M showing the position of radio link stations shown in the second example embodiment.

FIG. 4 shows a block diagram of a device according to a second example embodiment.

FIG. 5 is a schematic diagram showing the processing according to the second example embodiment.

FIG. 6 shows a graph generated by a graph making unit 23.

FIG. 7 shows a graph generated by the graph making unit 23.

FIG. 8 shows a block diagram of a device according to a second example embodiment.

FIG. 9 is a configuration diagram of an information processing apparatus according to embodiments.

DESCRIPTION OF EMBODIMENTS

First Example Embodiment

A first example embodiment of the disclosure is explained below with reference to the drawings. Referring to FIG. 1, a device 10 includes an acquiring unit 11, a learning unit 12 and an estimating unit 13. The device 10 is installed to estimate a radio quality at a radio base station.

The acquiring unit 11 is configured to acquire first weather information and first geographic information at a first observation point, second weather information and second geographic information at a second observation point, and radio quality information at the radio base station. The acquiring unit 11 includes, for example, a memory and/or network interface. For example, an observation station or observation equipment may be located at the first observation point, and the network interface of the acquiring unit 11 may acquire the first weather information observed by the observation station or the observation equipment and output to the network. The acquiring unit 11 may acquire the second weather information in a similar manner. However, the weather information may be observed not by an observation station or an observation equipment located at the observation point, but by an observation device, such as an artificial satellite, installed at a place remote from the observation point. In other cases, the observed weather information can be databased and it can be stored in the memory of the acquiring unit 11.

The first weather information is weather information observed at the first observation point or forecasted for the future at the first observation point. The second weather information is weather information observed at the second observation point or forecasted for the future at the second observation point. The weather information is information that can change radio quality, and includes at least one of information such as a sky condition such as fine weather and rain, temperature, humidity, atmospheric pressure, precipitation, wind velocity, and wind direction.

The first geographic information may include, for example, at least one of topographic information of the first observation point and information regarding a relative position between the radio base station and the first observation point. The second geographic information may include, for example, at least one of topographic information of the second observation point and information regarding a relative position between the radio base station and the second observation point. The topographic information indicates the characteristics of the location of the observation point, such as plains, forests, agricultural land, deserts, mountains, vacant land, cities, and industrial areas. The information regarding the relative position can be obtained, for example, from the position information of the radio base station and the first or second observation point on the map. The position information can be expressed by using, for example, at least one of latitude, longitude, and altitude. These factors have a large impact on weather changes and therefore have a large impact on weather-based radio quality estimation. Therefore, in the present disclosure, the first geographic information and the second geographic information are used to generate the model.

The learning unit 12 is configured to learn a model for estimating the radio quality based on the first weather information and the first geographic information, the second weather information and the second geographic information, and the radio quality information acquired by the acquiring means. For example, the learning unit 12 may perform supervised learning based on a predetermined algorithm to construct an AI (Artificial Intelligence) model. However, the learning unit 12 may generate the model by another learning method.

The estimating unit 13 is configured to estimate the radio quality using the model and at least one of third weather information at the first observation point and fourth weather information at the second observation point. The third weather information is weather information observed at the first observation point or forecasted for the future at the first observation point. The fourth weather information is weather information observed at the second observation point or forecasted for the future at the second observation point.

For example, the estimating unit 13 can use both the third weather information at the first observation point and the fourth weather information at the second observation point. However, for example, if, in the model, the contribution of the weather information at the first observation point on the radio quality is small, the estimating unit 13 can use the fourth weather information at the second observation point without using the third weather information of the first observation point. Conversely, if, in the model, the contribution of the weather information at the second observation point on the radio quality is small, the estimating unit 13 can use the third weather information at the first observation point without using the fourth weather information of the second observation point. Specific examples of such cases are as follows: the contribution of the weather information at the first/second observation point is less than a predetermined ratio of the contribution of the weather information at the second/first observation point, or the contribution of the weather information at the first/second observation point is less than a predetermined value.

FIG. 2 is a flowchart showing an example of processing executed by the device 10 according to the first example embodiment. The processing executed by the device 10 will be described below.

First, the acquiring unit 11 acquires, as data observed in the past, the first weather information and the first geographic information at the first observation point, the second weather information and the second geographic information at the second observation point, and the radio quality information at the radio base station as data for learning (Step S11).

Next, the learning unit 12 learns a model for estimating radio quality based on the acquired information (Step S12). In this example, the model outputs output value(s) indicating the estimated radio quality by inputting a predetermined value (e.g. weather information), for example. It should also be noted that geographic information of the observation points is taken into account in generating this model.

Then, the estimating unit 13 inputs at least one of the third weather information at the first observation point and the fourth weather information at the second observation point to the model to obtain output value(s) for estimating the radio quality. In this way, the estimating unit 13 estimates the radio quality (Step S13). The third weather information and the fourth weather information may be weather information observed at the time of executing the processing or before, or may be weather information predicted for the future.

The device 10 can estimate the radio quality more accurately by generating the prediction model reflecting not only weather information but also geographic information at the observation point(s). In addition, as an example, the device 10 and the radio base station may constitute a system.

Second Example Embodiment

A second example embodiment of the disclosure is explained below with reference to the drawings.

FIG. 3 is a map M showing the position of radio link stations shown in the second example embodiment for the purpose of explanation. In the map M, radio link stations $RL_1$ to $RL_3$ are shown, and the radio link stations $RL_1$ to $RL_3$ constitute a backhaul for relaying radio communication as radio base stations (wireless communicators). Note that the radio link stations $RL_1$ to $RL_3$ respectively transmit radio signals to which radio link station can be changed based on the current or predicted communication state. In this embodiment, a method for estimating the radio quality of the radio link station $RL_2$ will be described.

Weather stations $WS_1$ to $WS_5$ are provided around the radio link stations $RL_1$ to $RL_3$, and observe the weather at these stations to acquire weather data. The observed weather information includes the sky conditions such as fine weather and rain, temperature, humidity, atmospheric pressure, wind velocity and wind direction. The temperature information can include information on minimum and maximum temperatures. The meteorological authorities responsible for the weather stations $WS_1$ to $WS_5$ can also predict the weather at the weather stations $WS_1$ to $WS_5$ based on the weather information from the weather stations $WS_1$ to $WS_5$ and other information.

As described above, since the weather stations $WS_1$ to $WS_5$ are provided around the radio link stations $RL_1$ to $RL_3$, future weather at the radio link stations $RL_1$ to $RL_3$ can be predicted based on the weather of the weather stations $WS_1$ to $WS_5$. Thus, the radio quality in the radio link stations $RL_1$ to $RL_3$ can be estimated. However, the effect of the weather of each of the weather stations $WS_1$ to $WS_5$ on the future weather of the radio link stations $RL_1$ to $RL_3$ is not uniform.

For example, when the weather of the weather station $WS_1$ is clear, the weather of the weather station $WS_2$ is rainy, and wind is blowing from the weather station $WS_2$ to $WS_1$, rain clouds around the weather station $WS_2$ flow toward the radio link station $RL_2$. Therefore, the weather at the weather station $WS_2$ is likely to be the future weather at the radio link station $RL_2$. On the other hand, the weather around the weather station $WS_1$ is unlikely to be the future weather of the radio link station $RL_2$. Therefore, the future weather at the radio link station $RL_2$ is expected to be rainy.

In the second example embodiment, the information on the wind direction and wind velocity of the weather stations $WS_1$ to $WS_5$ (Hereinafter, it can be defined as wind information) is incorporated in the generation of a prediction model of the radio quality. Thus, the prediction model reflecting the effect of the wind information on the weather can be generated.

Furthermore, the topography around the radio link stations and the weather stations can affect the respective weather. The topography shows the characteristics of land or sea around each spot, and includes, for example, plains, forests, deserts, mountains, cities, and industrial zones. Depending on the topography, the likely weather conditions and changes in weather (For example, the flow of rain clouds) can vary.

As described above, in the second example embodiment, by using the topography information to the prediction model, it is possible to more accurately predict the weather of the radio link station, and consequently, more accurately predict the radio quality.

Next, the configuration and processing of the estimation device according to the second example embodiment will be described. Referring to FIG. 4, the estimation device 20 includes an acquiring unit 21, a preprocessing unit 22, a graph making unit 23, a model generation unit 24, a classification unit 25, and a memory 26. The estimation device 20 may be provided, for example, as a control device for controlling radio communication at radio link stations $RL_1$ to $RL_3$ and controlling radio communication at these radio link stations.

The acquiring unit 21 acquires 4 kinds of information as learning data in order to predict the transition of the weather of the radio link station $RL_2$. First, position information of the weather stations $WS_1$ to $WS_5$ and the radio link stations $RL_1$ to $RL_3$; second, weather information observed at the weather stations $WS_1$ to $WS_5$; third, radio information of the radio link stations $RL_1$ to $RL_3$; and fourth, topographic information at the weather stations $WS_1$ to $WS_5$ and the radio link stations $RL_1$ to $RL_3$. The acquiring unit 21 is an interface that enables communication with the outside.

The acquiring unit 21 acquires the position information of the weather stations $WS_1$ to $WS_5$ from an external network. For example, the acquiring unit 21 may access a homepage or a database of an organization, such as an authority having jurisdiction over the weather stations, to acquire location information of the weather stations. For example, in the case of Japan, the location information can be obtained from the homepage of the Japan Meteorological Agency. The acquiring unit 21 also acquires the position information of the radio link stations $RL_1$ to $RL_3$, which is previously stored in the memory 26. When the radio link stations $RL_1$ to $RL_3$ are transmitting the position information, the acquiring unit 21 may receive and acquire the position information. The location information in this example includes the latitude, longitude, and altitude of the weather stations or radio link stations. Thus, the acquiring unit 21 can grasp the positional relationship between the weather stations and the radio link stations shown in FIG. 3.

The acquiring unit 21 acquires the weather information observed in the weather stations $WS_1$ to $WS_5$ within a predetermined period from the external network in the same manner as the position information. Since the specific contents of the weather information are as described above, the description thereof is omitted.

However, the acquiring unit 21 may individually acquire the position information and the weather information of the weather stations $WS_1$ to $WS_5$ from the weather stations $WS_1$ to $WS_5$. Alternatively, this information may be acquired from the memory 26 or an external database.

The acquiring unit 21 also receives the radio information within a predetermined period at the radio link stations $RL_1$ to $RL_3$ from the radio link stations $RL_1$ to $RL_3$. The radio information is radio quality information including at least one of a frequency band, a capacity, a modulation method, a polarization, a radio link length, etc., used when the radio link station communicates with another station. The measurement period of the radio information at the radio link stations $RL_1$ to $RL_3$ is a (e.g., the same) period corresponding to the observation period of the weather information at the weather stations $WS_1$ to $WS_5$.

Further, the acquiring unit 21 acquires the topographic information at the weather stations $WS_1$ to $WS_5$ and the radio link stations $RL_1$ to $RL_3$. The acquiring unit 21 may acquire the topographic information by, for example, acquiring the map information from the external network and analyzing the map information. Alternatively, the acquiring unit 21 may acquire the topographic information previously stored in the memory 26. Since the specific contents of the topographic information are as described above, the description thereof is omitted.

The preprocessing unit 22 performs the following preprocessing on the data acquired by the acquiring unit 21. The preprocessing unit 22 removes noise from the acquired data, and integrates the position information of the weather stations $WS_1$ to $WS_5$ and the radio link stations $RL_1$ to $RL_3$ and the weather information observed at the weather stations $WS_1$ to $WS_5$ for post-processing. Further, the preprocessing unit 22 may determine whether or not there is missing data in the position information, the weather information, the radio information, and the topography information acquired by the acquiring unit 21, and if there is missing data in any information, the missing data may be interpolated by extrapolation or the like, or the missing data may be interpolated using different information.

The graph making unit 23 generates a connected graph for the AI model by using the data of the position information of the weather stations $WS_1$ to $WS_5$ and the radio link stations $RL_1$ to $RL_3$ and the weather information observed at the weather stations $WS_1$ to $WS_5$ preprocessed by the preprocessing unit 22. Details of this generation method will be described later. The graph making unit 23 also computes the direction of each link in the graph.

The model generation unit 24 uses the graph generated by the graph making unit 23 to perform supervised learning to generate the AI model for radio quality prediction. This model is learned so that output value(s) corresponding to input values are output when the weather information observed at the weather stations $WS_1$ to $WS_5$, the radio information at the radio link stations $RL_1$ to $RL_3$, and the topographic information at the weather stations $WS_1$ to $WS_5$ and the radio link stations $RL_1$ to $RL_3$ are the input values and a value indicating the radio quality of radio link station $RL_2$ is the output value(s). Details of this generation method will be described later.

The classification unit 25 inputs the current weather information observed at the weather stations $WS_1$ to $WS_5$ to the AI model generated by the model generation unit 24 as input values, thereby acquiring the output value(s) regarding the quality of the radio communication of the radio link station $RL_2$ after a predetermined time from the current. The classification unit 25 classifies the output value(s) into 9 classifications to estimate the quality of radio communication of the radio link station $RL_2$.

The memory 26 stores the processing executed by the acquiring unit 21 to the classification unit 25 as an algorithm. As described above, the memory 26 may store information such as the position information and the weather information in advance.

FIG. 5 is a schematic diagram showing the processing according to the second example embodiment. Referring to FIG. 5, a process executed by the estimation device 20 will be described below.

First, in the stage of data collection, the acquiring unit 21 acquires the position information of the weather stations $WS_1$ to $WS_5$ and the radio link stations $RL_1$ to $RL_3$, the weather information observed at the weather stations $WS_1$ to $WS_5$, the radio information of the radio link stations $RL_1$ to $RL_3$, and the topographic information at the weather stations $WS_1$ to $WS_5$ and the radio link stations $RL_1$ to $RL_3$ (Step S21). The preprocessing unit 22 preprocesses the acquired data.

Next, the graph making unit 23 generates a graph necessary for model generation. First, the graph making unit 23 generates the map M shown in FIG. 3 by using the position information of the weather stations $WS_1$ to $WS_5$ and the radio link stations $RL_1$ to $RL_3$. Then, in the map M in FIG. 3, the graph making unit 23 generates the graph constituting a network in which each of the weather station and the radio link station (hereinafter also referred to as node) is connected to other nodes by 1 or more links (edge). The graph making unit 23 executes processing to link each node with another node in a circle of radius d.

The graph making unit 23 determines an appropriate range of d in steps S22 and S23. First, the graph making unit 23 sets a range of d such that d is large enough that there are no nodes that are not connected (That is, nodes are not loosely coupled) and d is small enough that all nodes are not connected in one hop (That is, the nodes are not fully joined) in the map M (Step S22).

In the case where the nodes are loosely coupled, the data of the nodes that are not considered from the beginning is generated with respect to the radio link station $RL_2$ to which the radio quality is to be estimated, so that the prediction accuracy may deteriorate, which is not preferable. On the other hand, in the case where the nodes are all connected, the data of all the nodes are reflected in one hop with respect to the radio link station $RL_2$, and the number of parameters and learning data required for model generation increases, which is not preferable.

Based on the above provisions, the graph making unit 23 determines an appropriate range of d by using a predetermined algorithm. Note that the graph making unit 23 may set a value within the range of d such that the position of the node is slightly changed or the feature (homological polygon structure in space) is not changed. Such d may be defined as a permanent distance (persistent distance).

Next, the graph making unit 23 determines the value of d suitable for the AI model from the range of d determined in step S22 (Step S23). For example, the graph making unit 23 converts the distance between the two weather stations connected by a link to the predetermined d into a temporal distance in consideration of the wind information observed at the two weather stations. This temporal distance is shorter as the degree of coincidence of wind directions observed at the two weather stations is higher, and longer as the degree of coincidence is lower. The faster the wind speed at each weather station, the shorter the temporal distance is, and the slower it is, the longer the temporal distance is. This temporal distance represents the time until the weather conditions at one weather station affect the weather conditions at the other by wind. For example, the time it takes for a rain cloud above one weather station to move above the other is perceived by the temporal distance. The graph making unit 23 calculates the temporal distance for all links or each link within a range of the number of hops within a predetermined number with a radio link station $RL_2$ to be a radio quality determination object.

The graph making unit 23 executes the above-described calculation in a plurality of d (For example, a plurality of d separated by a predetermined value) within the range determined in step S22. With respect to the temporal distances calculated for all the links, d is determined such that the deviation of the temporal distances (For example, a variance relationship) is less than a predetermined value or is minimized.

The variation of weather between nodes depends not only on the distance between nodes but also on information such as wind speed and wind direction. For example, if a link having a slow change in weather and a link having a fast change in weather (for example, strong winds) are mixed at a given d, the estimation required for generating the model becomes complicated. In consideration of this, in step S23, the graph making unit 23 selects d such that the difference in the transition time of the weather assumed for each link (e.g., between adjacent weather stations) is as small as possible. Such d may be defined as an invariant temporary distance. Setting such d to determine the range to be analyzed for the model simplifies the prediction of weather trends. Therefore, the estimation device 20 can create a simpler and more accurate model. In addition, the processing required for modeling can be reduced.

The graph making unit 23 generates the graph in the map M using the d selected in step S23. FIG. 6 shows a graph generated in this manner. Based on the information shown in FIG. 6, the graph making unit 23 can determine the order (That is, how many hops) at which other nodes are coupled with respect to the radio link station $RL_2$ to be the radio quality determination target.

Next, the graph making unit 23 determines the directions of the links for all the links shown in FIG. 6 by using the information of the wind velocity and the wind direction at each weather station connected by the graph. The direction of the link determines an input side (i.e., the upwind side of the link) and an output side (That is, the leeward side of the link) of two nodes at both ends of the link. For example, the graph making unit 23 may determine the direction of the link by combining the wind velocity vectors measured at the nodes at both ends of the link.

FIG. 7 shows a graph in which the directions of the links are determined in this manner. With respect to the target radio link station $RL_2$, the nodes on the left side in the map M correspond to the input side, and the nodes on the right side correspond to the output side. That is, in FIG. 7, the wind is blowing from the left side to the right side.

More specifically, in FIG. 7, the primary inputs of the radio link station $RL_2$ are the weather stations $WS_1$ and $WS_5$, and the secondary inputs are the radio link station $RL_1$ and the weather station $WS_3$. The primary output of the radio link station $RL_2$ is the weather station $WS_4$, and the secondary outputs are the radio link station $RL_3$ and the weather station $WS_2$. Although not shown, the estimation device 20 can also recognize the 3rd order input and output of the radio link station $RL_2$.

In this manner, the estimation device 20 can determine how many inputs or outputs the other nodes have with respect to the radio link station $RL_2$, so that the weather transition at the radio link station $RL_2$ can be predicted.

Referring back to FIG. 5, the processing executed by the estimation device will be described below. The model generation unit 24 applies the teacher data to the graph generated in step S23 and learns it to generate the AI model from which output data corresponding to the input data is output (Step S25). The teacher data includes, as input data, the weather information, the radio information, and the topography information relating to input and output nodes within several orders from the radio link station $RL_2$, and includes, as output data, value(s) indicating the radio quality of the radio link station $RL_2$. As described above, the weather information is the weather information observed by the weather stations $WS_1$ to $WS_5$, the radio information is the radio information of the radio link stations $RL_1$ to $RL_3$, and the topographic information is the topographic information of the weather stations $WS_1$ to $WS_5$ and the radio link stations $RL_1$ to $RL_3$.

For example, the model generation unit 24 may generate the AI model for nodes located at a distance of up to the 3rd order from the radio link station $RL_2$. As an example, the model generation unit 24 performs a convolution calculation using the input values of the 1st to 3rd nodes as a combined feature matrix (concatenated feature matrix) based on the order. Then, the model generation unit 24 calculates the influence of the lower order node on the higher order node by using the LSTM (Long short-term memory). The model generation unit 24 performs the same calculation for the output values of the 1st to 3rd nodes. A model generation unit 24 generates the AI model based on calculation results of an input side and an output side. The model generation unit 24 may execute 3D convolution calculation as convolution calculation.

For example, in the graph shown in FIG. 7, the matrix of the primary input values in the radio link station $RL_2$ is as follows.

$$\begin{pmatrix} W_{5,t} & W_{1,t} \\ R_{5,t} & R_{1,t} \\ T_5 & T_1 \end{pmatrix}$$

Here, $W_{5,t}$, $R_{5,t}$, and $T_5$ are the weather information, the radio information, and the topography information in the weather station $WS_5$, respectively. $W_{1,t}$, $R_{1,t}$, and $T_1$ are the weather information, the radio information, and the topography information in the weather station $WS_1$, respectively.

The matrix of primary output values in the radio link station $RL_2$ is as follows.

$$\begin{pmatrix} W_{4,t} \\ R_{4,t} \\ T_4 \end{pmatrix}$$

Here, $W_{4,t}$, $R_{4,t}$, and $T_4$ are the weather information, the radio information, and the topography information in the weather station $WS_4$, respectively. Although the radio information at each weather station described above is treated as an input value in form, it is not reflected in the calculation result of the actual model.

As described above, the model generation unit 24 learns the relationship between the weather information of the selected weather station and the radio quality. Then, the classification unit 25 inputs at least one of the present weather information and the future weather information of the weather station to the learned AI model, thereby acquiring predicted value(s) (For example, a value that predicts a wireless link failure) relating to the radio quality of the radio link station $RL_2$.

When the estimation device 20 predicts the radio quality of the radio link station $RL_2$ after a predetermined time from the present time and uses the weather information at the present weather station, it is preferable that the weather information in the input values of the teacher data is obtained a predetermined time before the radio quality information of the output value(s) of the corresponding teacher data is obtained. This is because the prediction is made more accurate by matching the time difference between the input values and the output value(s) in learning with the time difference between the input values and the output value(s) in prediction.

For the same reason, when the estimation device 20 predicts the radio quality of the radio link station $RL_2$ after a predetermined time from the present time and uses the weather forecast after the predetermined time at the weather station, the weather forecast information in the input values of the teacher data is preferably obtained at a time when the radio quality information of the output data of the corresponding teacher data is obtained.

FIG. 8 is an example of a graph showing two kinds of predicted values output and their classification. In FIG. 8, as a predicted value, the horizontal axis of the graph shows a Background Bit Error (BBE) indicating the total amount of errors during a specified time period (In units of bytes), and the vertical axis of the graph shows an Error Seconds (ES) indicating the count of 1-second cycles in which errors occur.

In FIG. 8, the classification unit 25 determines that the failure probability of the radio link is low when the BBE is less than the predetermined value T1 and the ES is less than the predetermined value T3. The classification unit 25 determines that the failure probability of the radio link is high when the BBE is equal to or greater than the predetermined value T2 (>T1) and the ES is equal to or greater than the predetermined value T4 (>T3). When neither of these two conditions is met, the classification unit 25 determines that the probability of failure of the wireless link is moderate.

As described above, at the time of generating the AI model, the graph making unit 23 selects d such that the difference in the transition time of the weather assumed for each link is as small as possible. On the basis of the graph, the direction of the graph predicting the transition of weather in the radio link station is determined. As a result, the transition of the weather of the weather station selected as the learning object is similar to the transition of the weather of the radio link station as the object for specifying the radio quality. Even if a weather station that is simply close to the target radio link station is selected as a learning target, there is a possibility that the weather of the weather station will not change in the same way as the radio link station depending on the wind direction. In this case, it may take a long time to generate the model and the accuracy of the model may be deteriorated. However, since this is not the case in the second example embodiment, the accuracy of the model can be improved.

A current method for compensating for loss of radio quality on backhaul links is by detecting actual signal loss. This method is implemented after actual signal loss has occurred. Therefore, in order to reduce the possibility of a communication failure in advance, it is preferable to predict the communication failure. Since the radio quality is easily affected by the weather, it is conceivable to predict the radio quality using the weather.

However, the prediction of the communication failure has the following problems. First, when the communication failure is predicted using weather information, since the weather may change depending on the topography of the weather station or the radio link station, the accuracy of the weather prediction may become low, and the prediction accuracy of the communication failure may become low. Also, the prediction accuracy of the communication failure can be changed depending on the radio state (For example, modulation type, load/capacity).

Second, when weather observations or forecast data at weather stations are used to predict weather at radio link stations, the accuracy of the forecast may vary depending on the region or country. The higher the frequency of observations at weather stations (In other words, the temporal resolution of the data), the more accurate the predictions will be because the more data can be used in the time zone to be predicted by the radio link station. However, the accuracy of predictions decreases when the frequency of observations at weather stations is low. In addition, the greater the number of weather stations per predetermined area (In other words, the spatial resolution of the data), the more accurate the prediction since the data of weather stations close to the radio link station or where the future weather at the radio link station is predicted can be used. However, the smaller the number of weather stations, the less accurate the predictions are. Therefore, there was a possibility that accurate radio quality predictions could not be made, especially in areas where the frequency of weather observations at the weather stations was low or the number of weather stations was small. In addition, since it cannot be applied to various regions, there is a problem from the viewpoint of scalability.

In order to solve the second problem, it is conceivable to acquire accurate weather observation data from a special sensor installed in a radio link station, but there is a problem from the viewpoint of cost.

The estimation device 20 according to the second example embodiment solves such problems. The estimation device 20 acquires weather data from the outside to generate the learning model based on sufficient feature such as the weather information, the position information, the topography information, and the radio conditions.

In generating the learning model, the estimation device 20 generates the model by using the geographical information and the information of the wind direction of the weather station. This allows the estimation device 20 to generate the model more simply and accurately. This effect is further enhanced when the estimation device 20 also uses the wind velocity information. Further, as the geographic information, the estimation device 20 uses the information of the relative position between the weather station and the radio link station for generation of the model, so that an event in which the weather observed at the weather station is reflected on the radio link station can be reflected in the model.

The estimation device 20 can generate the model more accurately by using the topographic information of the weather station, which is a parameter for determining the weather, as the teacher data.

The estimation device 20 generates the network graph in which the radio link station and a plurality of weather stations are respectively connected, and learns the model by using the number of hops from the radio link station to each weather station. Thus, the model is generated in consideration of how long the weather at each weather station is reflected in the weather at the radio link station, so that the accuracy of the model can be improved.

Since the estimation device 20 generates the model reflecting the distance between the weather station and the radio link station and topographic information, accurate radio quality prediction (For example, the presence or absence of a failure in the radio link) can be performed even in an area where the frequency of observation by the weather station is low or the number of the weather stations is small. Scalability is also improved because it can be applied to regions with various characteristics.

Since the estimation device 20 can generate the model for capturing spatial and temporal features based on the graph, it is possible to develop a highly accurate and scalable AI model.

The graph-based AI model has the following advantages. First, multi-modal information can be input into the model. The input information is, for example, text, numbers, images, and the like. Second, the learning input data may be a relatively small amount of data corresponding to a link in the graph. Therefore, the processing required for the prediction is reduced.

Further, since the estimation device 20 does not require any special sensor or the like, it is advantageous in terms of cost.

The estimation device 20 can also use a set of nodes (combination of feature matrices) to reduce computational complexity when using large scale maps or maps with large number of weather stations and radio links.

It should be noted that the present invention is not limited to the above-described embodiment, and may be modified as appropriate without departing from the spirit of the invention. For example, specific examples of the position information, the radio information, and the topography information are not limited to those described in the above-described embodiments. It goes without saying that the estimation device 20 can estimate the radio quality not only of the radio link station $RL_2$ but also of other radio link stations.

The estimation device 20 may estimate not only the radio quality of the radio link station $RL_2$ at a specific time in the future, but also the radio quality of the radio link station $RL_2$ at a specific time zone in the future.

The estimation device 20 may use the result of past weather prediction as teacher data instead of or in combination with the result of past weather observation. For example, as the teacher data, instead of the result of the past weather observation, the past weather forecast at the weather station may be used as an input value, and the radio quality information of the radio link station $RL_2$ at the timing predicted by the weather forecast may be used as an output value. Thus, the estimation device 20 can predict the radio quality of the radio link station $RL_2$ on the basis of the weather forecast of the weather station at the time of predicting the radio quality. At this time, the estimation device 20 may determine the reliability of the weather forecast of the weather station by determining the degree of coincidence between the weather forecast of the weather station and the weather actually observed by the weather station. By reflecting the reliability of the weather forecast of the weather station in the input data, more accurate prediction becomes possible.

The graph generator 23 may further use the topography information at the weather stations $WS_1$ to $WS_5$ and the radio link stations $RL_1$ to $RL_3$ in step S23 to determine the temporal distance. The topographic information includes topographical features (For example, in mountainous areas and urban areas) in which the wind is likely to blow in a predetermined direction and topographical features in which the wind is not likely to blow in a predetermined direction. By using such topographic information, the temporal distance between the nodes can be set more accurately, so that a graph reflecting the actual wind blowing can be generated. Therefore, the estimation device 20 can generate a more accurate model.

The classification unit 25 analyzes only one of the BBE and ES (i.e., the model outputs as a predicted value) as a predicted value. Further, other calculated values may be used alone or in combination with at least one of BBE and ES. An example of such a calculated value is Serious Error Seconds (SES), which indicates a count of 1 second intervals with more than 30% errors. The classification unit 25 is not limited to 9 classifications of output values, and may classify the output values by any number of classifications.

In the second example embodiment, the estimation device 20 may issue an alarm from an alarm output unit when the failure probability of the wireless link is either high or moderate. Further, in the above case, the estimation device 20 may transmit a request to the radio link station $RL_2$ to perform the following processing in the time or time zone of the estimated radio quality so that no abnormality occurs in the radio communication of the future radio link station $RL_2$. Examples of the processing include an increase in the power used for the radio communication (at least either transmit or receive) performed by the radio link station $RL_2$, a reduction in the bit rate, an increased redundancy in the modulation method, and a rerouting of the traffic. Further, request(s) may be transmitted to at least one of the radio link station $RL_1$ and the radio link station $RL_3$ which execute radio communication with the radio link station $RL_2$ so as to execute the same processing. By automatically executing such processing, the estimation device 20 can mitigate the abnormality in the radio quality of the backhaul. In addition, since the above described processing concerning an increase in power or a decrease in communication speed is executed when necessary, the increase in power of the communication network and the decrease in communication speed when unnecessary can be alleviated.

The estimation device 20 may also set the aforementioned temporal distance by maximizing the amount of mutual information between the 2-weather data when high-resolution data about the weather station are available. If high-resolution data are available, it is possible to find the temporal distance by maximizing the mutual information between the two-weather data.

In the second example embodiment, it is assumed that the data resolution between different types of information, such as the position information, the radio information, and the topography information, or the data resolution between detailed information within the same type of information is different depending on the acquired information source. In such a case, the estimation device 20 may execute a minimum/maximum operation for aligning the data resolution in the preprocessing unit 22. Thus, the estimation device 20 can match the data resolution and generate the AI model by simplified processing.

Next, a hard configuration example of the device explained in the above-described plurality of embodiments is explained hereinafter with reference to FIG. 9.

FIG. 9 is a block diagram showing a configuration example of the information processing apparatus. As shown in FIG. 9, the information processing apparatus 90 includes a network interface 91, a processor 92, and a memory 93. The network interface 91 can transmit and receive data to and from other devices by wireless communication.

The processor 92 performs processes performed by the information processing apparatus 90 explained with reference to the sequence diagrams and the flowcharts in the above-described embodiments by loading software (a computer program) from the memory 93 and executing the loaded software. The processor 92 may be, for example, a microprocessor, an MPU (Micro Processing Unit), or a CPU (Central Processing Unit). The processor 92 may include a plurality of processors.

The memory 93 is formed by a combination of a volatile memory and a nonvolatile memory. The memory 93 may include a storage disposed apart from the processor 92. In this case, the processor 92 may access the memory 93 through an I/O interface (not shown).

In the example shown in FIG. 9, the memory 93 is used to store a group of software modules. The processor 92 can perform processes performed by the information processing apparatus explained in the above-described embodiments by reading the group of software modules from the memory 93 and executing the read software modules.

As explained above with reference to FIG. 9, each of the processors included in the information processing apparatus in the above-described embodiments executes one or a plurality of programs including a group of instructions to cause a computer to perform an algorithm explained above with reference to the drawings.

Furthermore, the information processing apparatus 90 may include the network interface. The network interface is used for communication with other network node apparatuses forming a communication system. The network interface may include, for example, a network interface card (NIC) in conformity with IEEE 802.3 series. The information processing apparatus 90 may receive the Input Feature Maps or send the Output Feature Maps using the network interface.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Part of or all the foregoing embodiments can be described as in the following appendixes, but the present disclosure is not limited thereto.

Supplementary Note 1

A method comprising:

acquiring first weather information and first geographic information at a first observation point, second weather information and second geographic information at a second observation point, and radio quality information at a radio base station;

learning a model for estimating radio quality based on the first weather information and the first geographic information, the second weather information and the second geographic information, and the radio quality information; and estimating the radio quality using the model and at least one of third weather information at the first observation point and or fourth weather information at the second observation point.

Supplementary Note 2

The method according to Supplementary Note 1, wherein the model is learned based on the first weather information, the first geographic information, and first wind direction information at the first observation point, the second weather information, the second geographic information, and second wind direction information at the second observation point, and the radio quality information.

Supplementary Note 3

The method according to Supplementary Note 1 or 2, wherein the model is learned based on the first weather information, the first geographic information, and first wind direction and wind speed information at the first observation point, the second weather information, the second geographic information, and second wind direction and wind speed information at the second observation point, and the radio quality information.

Supplementary Note 4

The method according to any one of Supplementary Notes 1 to 3, wherein the first geographic information includes topographic information of the first observation point, and the second geographic information includes topographic information of the second observation point.

Supplementary Note 5

The method according to any one of Supplementary Notes 1 to 4, wherein the first geographic information includes information about a relative position between the radio base station and the first observation point, and the second geographic information includes information about a relative position between the radio base station and the second observation point.

Supplementary Note 6

The method according to any one of Supplementary Notes 1 to 5, further comprising generating a network graph in which the radio base station and the first observation point and the radio base station and the second observation point are respectively connected; and wherein the model is learned by using the number of hops from the radio base station to the first observation point in the network graph and the number of hops from the radio base station to the second observation point in the network graph.

Supplementary Note 7

A device comprising:

an acquiring means for acquiring first weather information and first geographic information at a first observation point, second weather information and second geographic information at a second observation point, and radio quality information at a radio base station;

a learning means for learning a model for estimating radio quality based on the first weather information and the first geographic information, the second weather information and the second geographic information, and the radio quality information acquired by the acquiring means; and an estimating means for estimating the radio quality using the model and at least one of third weather information at the first observation point and or fourth weather information at the second observation point.

Supplementary Note 8

The device according to Supplementary Note 7, wherein the learning means learns the model based on the first weather information, the first geographic information, and first wind direction information at the first observation point, the second weather information, the second geographic information, and second wind direction information at the second observation point, and the radio quality information.

Supplementary Note 9

The device according to Supplementary Note 7 or 8, wherein the learning means learns the model based on the first weather information, the first geographic information, and first wind direction and wind speed information at the first observation point, the second weather information, the second geographic information, and second wind direction and wind speed information at the second observation point, and the radio quality information.

Supplementary Note 10

The device according to any one of Supplementary Notes 7 to 9, wherein the first geographic information includes topographic information of the first observation point, and the second geographic information includes topographic information of the second observation point.

Supplementary Note 11

The device according to any one of Supplementary Notes 7 to 10, wherein the first geographic information includes information about a relative position between the radio base station and the first observation point, and the second geographic information includes information about a relative position between the radio base station and the second observation point.

Supplementary Note 12

The device according to any one of Supplementary Notes 7 to 11, further comprising:

a generating means for generating a network graph in which the radio base station and the first observation point and the radio base station and the second observation point are respectively connected; and wherein the learning means learns the model using the number of hops from the radio base station to the first observation point in the network graph and the number of hops from the radio base station to the second observation point in the network graph.

Supplementary Note 13

A system comprising:

a radio base station; and a device, wherein the device comprising:

an acquiring means for acquiring first weather information and first geographic information at a first observation point, second weather information and second geographic information at a second observation point, and radio quality information at the radio base station;

a learning means for learning a model for estimating radio quality based on the first weather information and the first geographic information, the second weather information and the second geographic information, and the radio quality information acquired by the acquiring means; and an estimating means for estimating the radio quality using the model and at least one of third weather information at the first observation point or fourth weather information at the second observation point.

Supplementary Note 14

The system according to Supplementary Note 13, wherein the learning means learns the model based on the first weather information, the first geographic information, and first wind direction information at the first observation point, the second weather information, the second geographic information, and second wind direction information at the second observation point, and the radio quality information.

Supplementary Note 15

The system according to Supplementary Note 13 or 14, wherein the learning means learns the model based on the first weather information, the first geographic information, and first wind direction and wind speed information at the first observation point, the second weather information, the second geographic information, and second wind direction and wind speed information at the second observation point, and the radio quality information.

Supplementary Note 16

The system according to any one of Supplementary Notes 13 to 15, wherein the first geographic information includes topographic information of the first observation point, and the second geographic information includes topographic information of the second observation point.

Supplementary Note 17

The system according to any one of Supplementary Notes 13 to 16, wherein the first geographic information includes information about a relative position between the radio base station and the first observation point, and the second geographic information includes information about a relative position between the radio base station and the second observation point.

Supplementary Note 18

The system according to any one of Supplementary Notes 13 to 17,
  wherein the device further comprises a generating means for generating a network graph in which the radio base station and the first observation point and the radio base station and the second observation point are respectively connected; and
  the learning means learns the model using the number of hops from the radio base station to the first observation point in the network graph and the number of hops from the radio base station to the second observation point in the network graph.

Supplementary Note 19

A non-transitory computer readable medium storing a program for causing a computer to execute:
  acquiring first weather information and first geographic information at a first observation point, second weather information and second geographic information at a second observation point, and radio quality information at a radio base station;
  learning a model for estimating radio quality based on the first weather information and the first geographic information, the second weather information and the second geographic information, and the radio quality information; and
  estimating the radio quality using the model and at least one of third weather information at the first observation point or fourth weather information at the second observation point.
  It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

REFERENCE SIGNS LIST 10 device
11 acquiring unit
12 learning unit
13 estimating unit
20 estimation device
21 acquiring unit
22 preprocessing unit
23 graph making unit
24 model generation unit
25 classification unit
26 memory

What is claimed is:
1. A method comprising:
acquiring first weather information and first geographic information at a first observation point, second weather information and second geographic information at a second observation point, and radio quality information at a radio base station;
learning a model for estimating radio quality based on the first weather information and the first geographic information, the second weather information and the second geographic information, and the radio quality information; and
estimating the radio quality using the model and at least one of third weather information at the first observation point or fourth weather information at the second observation point,
wherein the first geographic information indicates terrain or land use of the first observation point, and the second geographic information indicates terrain or land use of the second observation point, and
wherein the learning the model further comprises:
generating a network graph in which the radio base station, the first observation point, and the second observation point are represented as nodes and an edge is created between any two nodes;
converting the network graph into a directed graph by orienting the edge from an up-wind node toward a down-wind node based on first wind direction information at the first observation point or second wind direction information at the second observation po int; and
determining, in the directed graph, a hop count from the radio base station to the first observation point and a hop count from the radio base station to the second observation point, and supplying the hop counts as additional time-delay features to the model.
2. The method according to claim 1,
wherein the model is learned based on the first weather information, the first geographic information, and first wind direction information at the first observation point, the second weather information, the second geographic information, and second wind direction information at the second observation point, and the radio quality information.
3. The method according to claim 1,
wherein the first geographic information includes information about a relative position between the radio base station and the first observation point, and the second geographic information includes information about a relative position between the radio base station and the second observation point.
4. The method according to claim 1,
further comprising generating a network graph in which the radio base station and the first observation point and the radio base station and the second observation point are respectively connected; and
wherein the model is learned by using the number of hops from the radio base station to the first observation point in the network graph and the number of hops from the radio base station to the second observation point in the network graph.
5. The method according to claim 1,
wherein the first geographic information and the second geographic information indicate at least one of plains, forests, agricultural land, deserts, mountains, vacant land, cities, and industrial areas.
6. A device comprising:
at least one memory configured to store instructions; and
at least one processor configured to execute the instructions to:

acquire first weather information and first geographic information at a first observation point, second weather information and second geographic information at a second observation point, and radio quality information at a radio base station;

learn a model for estimating radio quality based on the first weather information and the first geographic information, the second weather information and the second geographic information, and the radio quality information acquired; and estimate the radio quality using the model and at least one of third weather information at the first observation point or fourth weather information at the second observation point, wherein the first geographic information indicates terrain or land use of the first observation point, and the second geographic information indicates terrain or land use of the second observation point, and wherein the at least one processor is further configured to execute the instructions to learn the model by:

generating a network graph in which the radio base station, the first observation point, and the second observation point are represented as nodes and an edge is created between any two nodes;

converting the network graph into a directed graph by orienting the edge from an up-wind node toward a down-wind node based on first wind direction information at the first observation point or second wind direction information at the second observation point; and determining, in the directed graph, a hop count from the radio base station to the first observation point and a hop count from the radio base station to the second observation point, and supplying the hop counts as additional time-delay features to the model.

7. The device according to claim 6, wherein the at least one processor is further configured to learn the model based on the first weather information, the first geographic information, and first wind direction information at the first observation point, the second weather information, the second geographic information, and second wind direction information at the second observation point, and the radio quality information.

8. The device according to claim 6, wherein the first geographic information includes information about a relative position between the radio base station and the first observation point, and the second geographic information includes information about a relative position between the radio base station and the second observation point.

9. The device according to claim 6, wherein the at least one processor is further configured to:

generate a network graph in which the radio base station and the first observation point and the radio base station and the second observation point are respectively connected; and learn the model using the number of hops from the radio base station to the first observation point in the network graph and the number of hops from the radio base station to the second observation point in the network graph.

10. The device according to claim 6, wherein the first geographic information and the second geographic information indicate at least one of plains, forests, agricultural land, deserts, mountains, vacant land, cities, and industrial areas.

11. A system comprising:

a radio base station; and a device, wherein the device comprising:

at least one memory configured to store instructions; and at least one processor configured to execute the instructions to:

acquire first weather information and first geographic information at a first observation point, second weather information and second geographic information at a second observation point, and radio quality information at the radio base station;

learn a model for estimating radio quality based on the first weather information and the first geographic information, the second weather information and the second geographic information, and the radio quality information; and estimate the radio quality using the model and at least one of third weather information at the first observation point or fourth weather information at the second observation point, wherein the first geographic information indicates terrain or land use of the first observation point, and the second geographic information indicates terrain or land use of the second observation point, and where in the at least one processor is further configured to execute the instructions to learn the model by:

generating a network graph in which the radio base station, the first observation point, and the second observation point are represented as nodes and an edge is created between any two nodes;

converting the network graph into a directed graph by orienting the edge from an up-wind node toward a down-wind node based on first wind direction information at the first observation point or second wind direction information at the second observation point; and determining, in the directed graph, a hop count from the radio base station to the first observation point and a hop count from the radio base station to the second observation point, and supplying the hop counts as additional time-delay features to the model.

12. The system according to claim 11, wherein the at least one processor is further configured to learn the model based on the first weather information, the first geographic information, and first wind direction information at the first observation point, the second weather information, the second geographic information, and second wind direction information at the second observation point, and the radio quality information.

13. The system according to claim 11, wherein the first geographic information includes information about a relative position between the radio base station and the first observation point, and the second geographic information includes information about a relative position between the radio base station and the second observation point.

14. The system according to claim 11, wherein the at least one processor is further configured to:

generate a network graph in which the radio base station and the first observation point and the radio base station and the second observation point are respectively connected; and learn the model using the number of hops from the radio base station to the first observation point in the network graph and the number of hops from the radio base station to the second observation point in the network graph.

15. The system according to claim 11, wherein the first geographic information and the second geographic information indicate at least one of plains, forests, agricultural land, deserts, mountains, vacant land, cities, and industrial areas.

\* \* \* \* \*